(No Model.)
A. H. INGALLS.
INSECT DESTROYER.
No. 381,377. Patented Apr. 17, 1888.
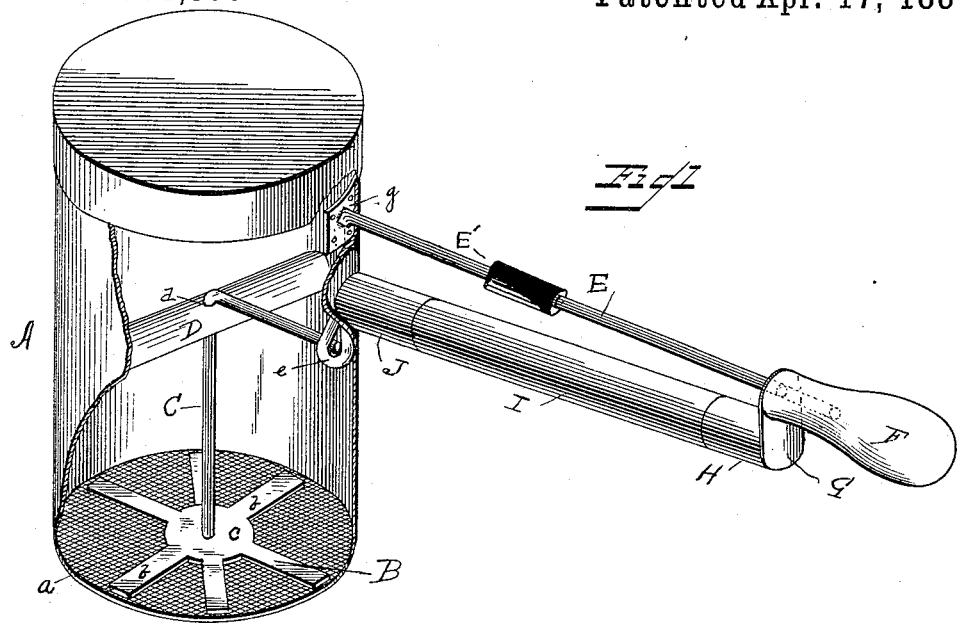
Fig. 1
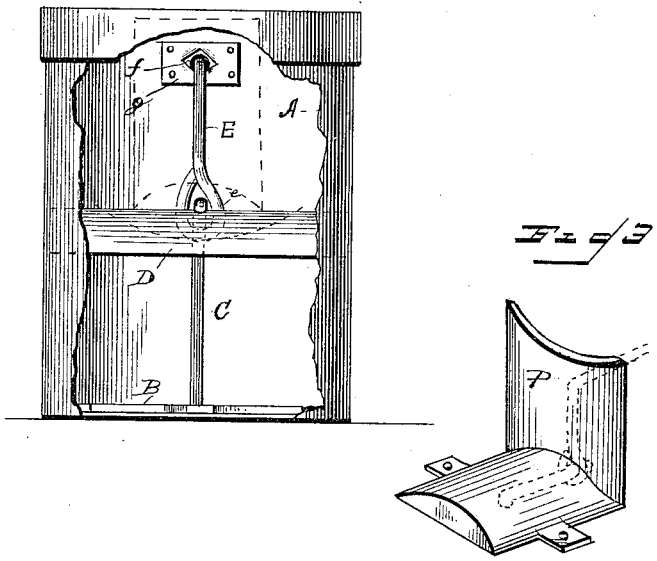
Fig. 2
Fig. 3
WITNESSES,
John Imirie.
Henry J. Hayden.
INVENTOR,
Asa H. Ingalls.
Attorney.
N. PETERS, Photo-Lithographer, Washington, D. C.

UNITED STATES PATENT OFFICE.

ASA H. INGALLS, OF HANOVER CENTRE, NEW HAMPSHIRE.

INSECT-DESTROYER.

SPECIFICATION forming part of Letters Patent No. 381,377, dated April 17, 1888.

Application filed February 15, 1888. Serial No. 264,079. (No model.)

*To all whom it may concern:*

Be it known that I, ASA H. INGALLS, a citizen of the United States, residing at Hanover Centre, county of Grafton, and in the State of New Hampshire, have invented a new and useful Improvement in Insect-Destroyers, of which the following is a specification, reference being had to the accompanying drawings, forming a part of this specification.

The object of my invention is to provide a simple, durable, and economical device for sifting or sprinkling paris green, London purple, or other poisons (combined, if desired, with ashes, plaster, or flour) upon vines or plants.

The nature of my invention will be described below, and pointed out in the claims.

In the drawings, Figure 1 is a broken perspective. Fig. 2 is a front view of the can, partly broken away to show internal parts. Fig. 3 is a detail of the internal guard or cover.

Like letters refer to like parts.

A is a can or tin receptacle of any desirable size, which has a reticulated or perforated bottom, $a$. Upon the latter rests without any pivot a rimless rotating wheel or clearer, B, said clearer being composed in this instance of six radial arms, $b$, and a hub, $c$, all integral. From the top of said hub $c$ an axle, C, extends up and passes through a hole or journal, $d$, in the cross-bar D, which extends entirely and centrally across the receptacle A. Just above the hole $d$ the axle C is bent at right angle, the free end reaching nearly to the wall of the receptacle and passing through the hooked end $e$ of the oscillating or shaking rod E. From the vertical of said hook the rod E is bent to a horizontal and passes through a perforation, $f$, in the wall of the receptacle, and just below the perforation is a wearing-plate, $g$, riveted on, which prevents the abrasion of the wall and the enlargement of perforation $f$ when rod E oscillates. The said rod is provided with a handle, F, and a loose handle, E', and bears or is journaled in a perforated arm, G, extending up from sleeve H, attached to the outer end of an arm or handle, I, entering socket J, the latter being soldered or riveted to receptacle A, as desired. The handle I inclines upward toward the rod E, in order to have the arm G short and strong and for convenience of manipulation, and the length of said rod and handle may be as desired.

P is a guard or cover attached to bar D, to keep the powder from the bend of axle C and the end $e$ of rod E.

The device may be operated in two ways—first, by holding handle I steady and turning handle F back and forth, which will cause oscillating hook $e$ to rotate bent axle C and the clearer; and, second, by rigidly grasping and swinging handles F E' from right to left without taking hold of handle I. In the latter way, on account of the hole $f$ and that in arm G, the rod E acts as a bearing on which the receptacle A and handle I oscillate, and at the same time the clearer will rotate for the changing position of the swinging receptacle. Hook $e$, being nearly stationary, causes axle C to rotate also.

The device could be operated by simply turning handle F; but the sifting will not be as effective as in the ways above mentioned.

Having fully described my invention, what I claim, and desire to secure by Letters Patent, is—

1. The combination, with the receptacle having a perforated bottom, of the rotary clearer, the bent axle, the bent operating-rod passing through the wall of the receptacle, and a handle or arm below the rod having a bearing for said rod, whereby the clearer is rotated by turning the rod, or the receptacle is oscillated and the clearer rotated at the same time by swinging said rod from side to side, as set forth.

2. The combination, with the receptacle provided with a perforated bottom and an opening, $f$, of the rotary clearer, the bent axle, the transverse cross-bar having an opening or bearing for said axle, the hooked bent operating-rod and its handle, and the arm or handle I, having an arm, G, perforated to give an outer bearing for said operating-rod, as set forth.

In testimony whereof I have hereunto set my signature in the presence of two witnesses.

ASA H. INGALLS.

Witnesses:
J. M. FULLER,
G. S. BLAKELY.